(12) United States Patent
May (10) Patent No.: US 7,494,230 B2
(45) Date of Patent: Feb. 24, 2009

(54) REFLECTING NON-VISIBLE LIGHT OFF ONE OR MORE MIRRORS

(75) Inventor: Gregory J. May, Corvallis, OR (US)

(73) Assignee: Hewlett-Packard Development Company, LP, Houston, TX (US)

( * ) Notice: Subject to any disclaimer, the term of this patent is extended or adjusted under 35 U.S.C. 154(b) by 515 days.

(21) Appl. No.: 11/159,965

(22) Filed: Jun. 23, 2005

(65) Prior Publication Data

US 2006/0290905 A1    Dec. 28, 2006

(51) Int. Cl.
*G03B 21/26* (2006.01)

(52) U.S. Cl. .................... 353/122; 353/94; 353/84; 348/771

(58) Field of Classification Search ............ 353/28, 353/79, 94, 122, 84; 359/443, 459–461; 348/771
See application file for complete search history.

(56) References Cited

U.S. PATENT DOCUMENTS

| | | | |
|---|---|---|---|
| 4,505,558 A | 3/1985 | Albers | 353/20 |
| 5,193,015 A | 3/1993 | Shanks | 349/115 |
| 5,570,108 A | 10/1996 | McLaughlin | 715/823 |
| 5,633,691 A | 5/1997 | Vogeley et al. | |
| 6,023,264 A | 2/2000 | Gentile | 345/596 |
| 6,246,446 B1 | 6/2001 | Heimbuch | 348/750 |
| 6,483,643 B1 | 11/2002 | Zuchowski | 359/443 |
| 6,538,814 B2 | 3/2003 | Hunter | 359/449 |
| 6,674,579 B2 | 1/2004 | Brennesholtz | 359/634 |
| 6,680,579 B2 | 1/2004 | Allen | 315/169.3 |
| 6,715,879 B2 | 4/2004 | De Vaan | 353/20 |
| 6,788,469 B2 | 9/2004 | Dewald | 359/634 |
| 6,809,792 B1 * | 10/2004 | Tehranchi et al. | 352/85 |
| 6,816,141 B1 | 11/2004 | Fergason | 345/88 |
| 6,987,610 B2 * | 1/2006 | Piehl | 359/443 |
| 7,072,108 B2 * | 7/2006 | Cruz-Uribe et al. | 359/443 |
| 2001/0028501 A1 | 10/2001 | Hunter | 359/449 |
| 2002/0181097 A1 * | 12/2002 | Tegreene et al. | 359/443 |
| 2003/0081183 A1 | 5/2003 | Barnhurst | 353/46 |
| 2003/0128337 A1 | 7/2003 | Jaynes | 353/30 |
| 2003/0193565 A1 | 10/2003 | Wen | 348/184 |
| 2004/0012849 A1 | 1/2004 | Cruz-Uribe | 359/449 |
| 2004/0160581 A1 * | 8/2004 | Parker et al. | 353/122 |
| 2005/0128581 A1 * | 6/2005 | Samuels et al. | 359/443 |
| 2006/0244925 A1 * | 11/2006 | Seki et al. | 353/52 |
| 2006/0274288 A1 * | 12/2006 | Conner | 353/94 |
| 2006/0279839 A1 * | 12/2006 | May et al. | 359/443 |
| 2007/0070499 A1 * | 3/2007 | Fricke et al. | 359/443 |
| 2007/0081239 A1 * | 4/2007 | May et al. | 359/443 |
| 2007/0085977 A1 * | 4/2007 | Fricke et al. | 353/79 |
| 2007/0206280 A1 * | 9/2007 | May et al. | 359/443 |

FOREIGN PATENT DOCUMENTS

| | | |
|---|---|---|
| EP | EP 0 635 986 A1 | 1/1995 |
| WO | WO 99/63385 A1 | 12/1999 |
| WO | WO 02/13226 A2 | 2/2002 |

* cited by examiner

*Primary Examiner*—Andrew T Sever (57) ABSTRACT

Embodiments of reflecting non-visible light off one or more mirrors are disclosed. In an embodiment, non-visible light may be reflected off of one or more mirrors in an off positon and a portion of a screen may be illuminated with the non-visible light. Other embodiments are also disclosed.

27 Claims, 5 Drawing Sheets

REFLECTING NON-VISIBLE LIGHT OFF ONE OR MORE MIRRORS

BACKGROUND

Typical front projection systems may provide images that are less desirable than those provided by other projection systems. For example, when a front projection system is used in an environment with ambient light (such as a bright room), projected images may be displayed with an undesirably low contrast. Hence, current front projection implementations may provide inappropriate results when used in the presence of ambient light.

BRIEF DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Various embodiments for modifying a characteristic, such as an optical characteristic, of a screen are described. In one embodiment, an optical characteristic of a portion of a screen is modified by light. The optical characteristic that is modified may be the screen's reflectivity and/or absorbance. Also, the optical characteristic may be modified for one or more pixels of the screen. Thus, the light may be sufficiently focused to control the optical characteristic of a single pixel projected on the screen. Additionally, the light may be provided through one or more spectrums of light such as non-visible light (i.e. light not readily visible to the unaided human eye, such as ultraviolet light and infrared light). Furthermore, the light may be activated to modify the optical characteristic when no visible light is projected on the given portion of the screen.

Figure 1:
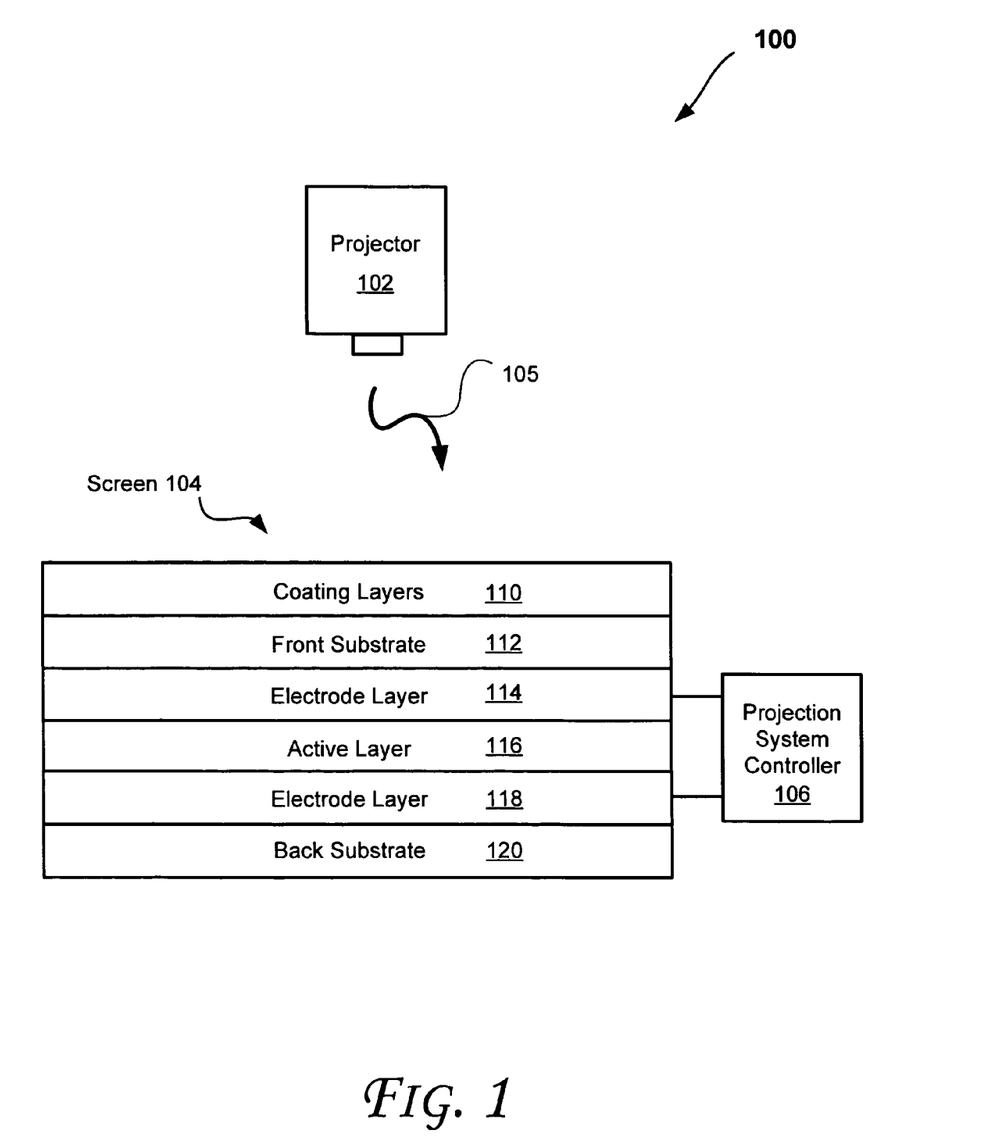
FIG. 1 illustrates a block diagram of an embodiment of a front projection system, according to an embodiment.

FIG. 1 illustrates a block diagram of an embodiment of a front projection system 100, according to an embodiment. The front projection system 100 includes a projector 102 to project images on an embodiment of a screen, such as a screen 104. The projector 102 may provide visible and/or non-visible light (105) as will be further discussed herein. The screen 104 may be a suitable projection screen such as a rear projection screen or a front projection screen. As illustrated in FIG. 1, the screen 104 may be coupled to a projection system controller 106. The projection system controller 106 may coordinate the operation of the projector 102 and the screen 104. Also, the projection system controller 106 may control the reset of the screen 104 (e.g., when difficulties are encountered with timing, image projection, and the like), provide and/or condition a power supply (e.g., providing electrical power to the screen 104), and/or establish the timing of the reset. The projector 102 may be any suitable digital projector such as a liquid crystal display (LCD) projector, a digital light processing (DLP) projector, and the like. Moreover, even though FIG. 1 illustrates a front projection system (100), the techniques discussed herein may be applied to a rear projection system. For example in a rear projection screen system, the transmissiveness of the screen may be modified.

The screen 104 may be an active projection screen with a modifiable optical characteristic, e.g., that is capable of assuming multiple reflectivity and/or absorbance states. The multiple reflectivity and/or absorbance states may provide a higher contrast ratio in the presence of ambient light and/or a color projected on the screen 104 by the projector 102 than would otherwise be obtained, as is further discussed herein.

As illustrated in FIG. 1, the screen 104 may include one or more coating layers 110, a front substrate 112, an electrode layer 114, an active layer 116, an electrode layer 118, and a back substrate 120. The coating layers 110 may be one or more layers deposited on the front substrate 112 that may include an antireflective layer such as a suitable anti-glare surface treatment, an ambient rejection layer such as a plurality of optical band pass filters, one or more micro-lenses, and/or a diffuse layer. The front substrate 112 may be an optically clear and flexible material such as Polyethylene Terephthalate (PET or PETE) on which the coating layers 110 are formed. The electrode layer 114 may be formed on the bottom surface of the front substrate 112.

The electrode layer 114 may be one or more suitable transparent conductors such as Indium Tin Oxide (ITO) or Polyethylene Dioxythiophene (PEDOT). In one embodiment, the electrode layer 114 may form the top conductor(s) of the active layer 116.

The active layer 116 may be an optically and/or electrically active layer that responds to the application of light or voltage across itself with a change in its absorbance and/or reflectivity. A number of different active layers 116 may provide such a response. One example includes a polymer dispersed liquid crystal (PDLC) layer in which pockets of liquid crystal material are dispersed throughout a transparent polymer layer. In an embodiment, the active layer 116 may be a continuous dichroic-doped PDLC layer that appears white (or black) in color under a no voltage condition. In an embodiment, an optical sensor may be used to sense non-visible light from the projector 102 and signal the active layer 116 to activate and/or change states. The optical sensor may be located at any suitable location to receive the light from the projector 102, such as around the periphery of the screen 104. In some embodiments, a chemical coating or thin film layer of electrochromic material, such as Tungsten Oxide, or photochromic material, across which an electric field may be selectively applied, may serve as the active layer 116 and may be made photosensitive. The application of a bias across such an electrochromic material active layer (116) (or the addition of the appropriate wavelength of light to the active layer 116 that is light sensitive) may enable the screen 104 to switch from white to gray or white to clear, in which case a gray or black backer may be included. Such an embodiment may include an ITO array type of conductive layer 114 on the front or top of the screen 104 and a second conductive layer (118) on the opposite side of the active layer near the back layer.

In an embodiment, the active layer (116) may be optically active where it responds to certain wavelengths or wavelength band of light and may or may not include a set of electrode conductive layers to apply additional voltage to the material resulting in similar control and/or response of the system. The set of electrodes may be used to bias the optically active layer (116) to aid in its switching function or enhance its optical characteristics. The optical response of the screen (104) may be related to the amount of non-visible light hitting the optically active area of the screen (104).

In an embodiment, the electrode layer 118 may be similar to the electrode layer 114 and be positioned on the back substrate 120. An opposite charge may be applied to the electrode layer 118 (e.g., relative to the charge applied to the electrode layer 114). Similarly, the back substrate 120 may be similar to the front substrate 112 in material composition but different in its position at the bottom of the stack of the screen 104, and its relatively darker color (or white if the active material is black in the non-energized state). In one embodiment, the projection system controller 106 selectively applies a voltage across the active layer 116 via the application of opposite charges to the electrode layers 114 and 118. The selective application of the voltage across the active layer 116 may enable the adjustment of the optical characteristic of the screen (104) over time and/or for a plurality of sections of the screen (104).

In an embodiment, light is projected from the projector 102 and impinges upon the screen 104. The coating layers 110 may serve to reduce specular reflection both in the visible and non-visible range from the screen 104 by implementing an antireflection coating. The coating layers 110 may also serve to absorb and/or deflect a portion of the ambient light that may be generated by extraneous sources other than the projector 102, e.g., by implementing an ambient rejection coating. The coating layers 110 allow a portion of the light incident upon its surface to pass through (partially diffuse) to the layers underlying the coating layers 110.

In one embodiment of front projection system 100, the active layer 116 is a continuous optically active material that is capable of assuming multiple states of reflectivity (or absorbance). Upon receiving an appropriate optical signal, the active layer 116, or a portion thereof (such as one or more pixels), switches between at least two states of reflectivity (or absorbance). With the inclusion of a black layer below active layer 116 (e.g., coated atop electrode layer 118, below electrode layer 118, or atop back substrate 120), the stacked configuration of the projection screen 110 provides a display that may change from off white (or milky white) to black.

In one embodiment, the screen 104 may include white and clear modes (referring to modes of active layer 116), where clear mode provides a view of the black/dark back layer (e.g., 120). Alternatively, the screen 104 may include black and clear modes, e.g., the active layer (116) is dyed black or dark gray for absorbance purposes. In this case, a highly reflective back layer (120) may be utilized, rather than a black layer.

In some embodiments, the screen 104 may be modular and segmented into a plurality of pixels, the size of which may or may not match the resolution of the projector 102. Such a front projection system (100) may provide enhanced image contrast by selectively changing the reflectance and/or absorbance of either the entirety of the screen 104 and/or sections of the screen 104, e.g., in coordination with projected image modification by the projection system controller 106 and the ambient light (105). The front projection system 100 therefore may create relatively deeper black by changing the color of the screen (104) from white to black. Under ambient light conditions, such a system (100) may produce a contrast ratio that may be the multiplicative product of the inherent contrast ratio of the projector 104 and the contrast change made by the screen 104.

Furthermore, in an embodiment, the front projection system 100 may provide reduction of contrast loss due to ambient light contamination. As the contrast ratio of the screen 104 may be the greatest achievable reflectivity for the embodiment of the screen 104 used divided by the lowest achievable reflectivity for the embodiment of the screen 104 used, and the contrast ratio of the front projection system 100 may be approximately the multiplicative product of the contrast ratio of the projector 102 in a bright room setting and the contrast ratio of the screen 104, the provision of the screen 104 having a modest 5:1 contrast ratio in certain settings may provide a relatively high perceived reduction in ambient light to the projected image.

Figure 2:
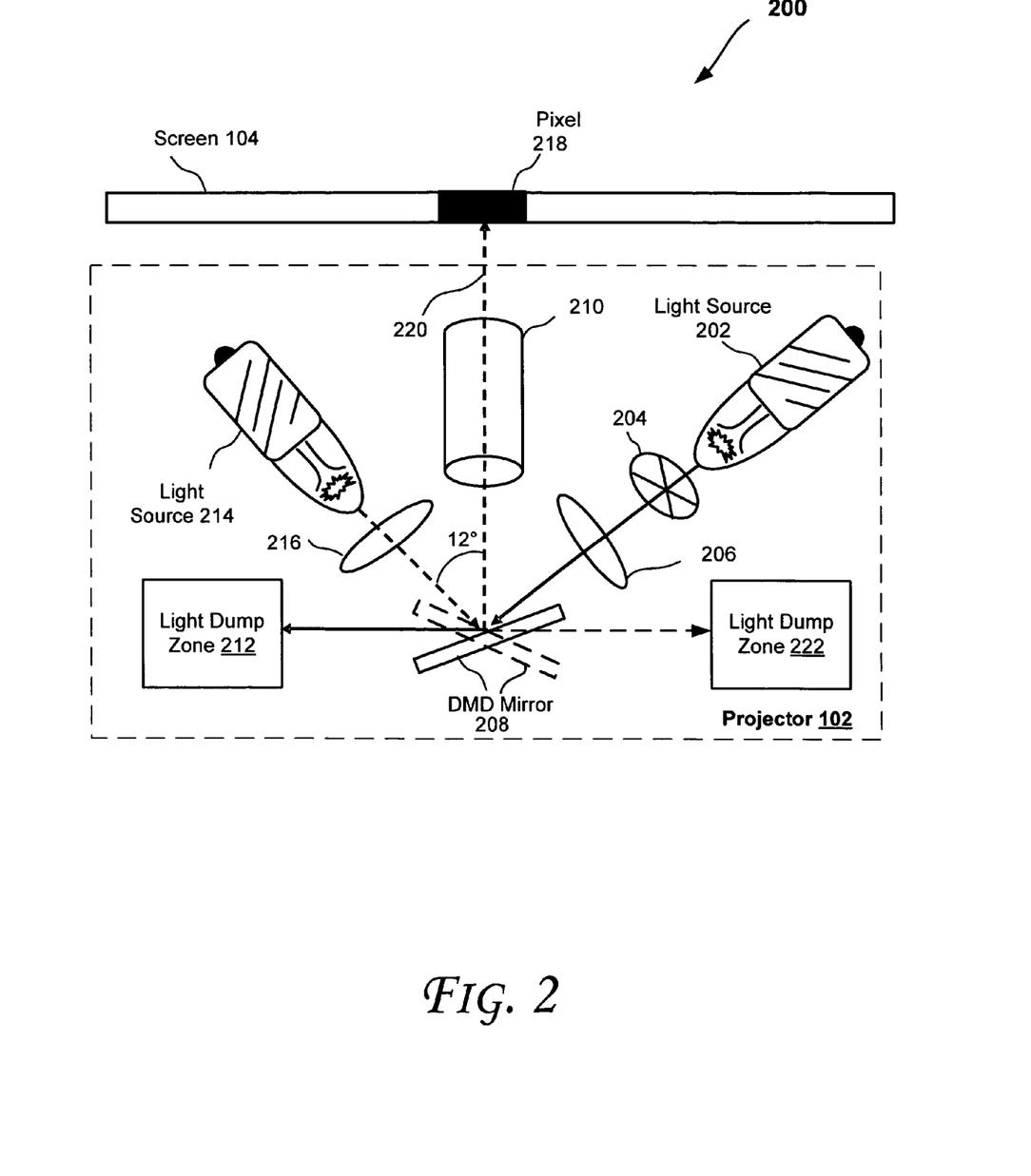
FIGS. 2-4 illustrate sample components of various embodiments of projection systems, according to various embodiments.

FIG. 2 illustrates sample components of an embodiment of a projection system 200, according to an embodiment. The system 200 includes a projector (such as the projector 102 of FIG. 1). The projector (102) includes a light source 202 to emit visible light, color wheel 204, optical elements 206, one or more digital micromirror device (DMD) mirrors 208, lens 210, and light dump zone 212. The light source 202 may be any suitable electromagnetic radiation source such as a lamp, light emitting diode (LED), or bulb to radiate across a range of wavelengths, including the visible spectrum. The color wheel 204 is a rotating disc that includes red, green, blue, and sometimes white segments. The color wheel 204 is positioned appropriately with respect to the light source 202 such that upon transmission of light from the light source 202 through the color wheel 204, red, green, blue, or white colored light is directed to the optical elements 206. Alternatively, the color wheel 204 may include cyan, magenta, and yellow (and sometimes black) color segments. Alternatively, the light source may be solid state such as a LED (where a color filter wheel may or may not be used). These filters may also perform other functions such as filtering out non-visible wavelengths to avoid falsely activating the screen (104).

Optical elements 206 may include several elements that focus, collimate, direct, and/or filter colored light before impinging on the DMD mirror 208. Optical elements 206 may include ultra violet (UV) and/or infrared (IR) filters, a channeling array such as a gooseneck set of mirrors, and one or more focusing elements and/or smoothing elements, such as an integrating rod, such that the colored light that is directed to DMD mirror 208 is of the appropriate size, shape, area, uniformity, and/or within the appropriate wavelength range.

In one embodiment, the projector 102 may be a DLP projector that incorporates technology based on an optical semiconductor called the digital micromirror device (DMD). DMDs contain an array of microscopic mirrors (208) that correspond to the pixels in a projected image. A digital signal activates an electrode beneath each mirror, thereby tilting the mirror toward or away from a light source. Tilted toward the light (the ON position), the mirror reflects light corresponding to a pixel onto the screen. Tilted away from the light (the OFF position), the mirror's space does not cause illumination of an area on the screen corresponding to a pixel. The DMD mirrors may tilt between the on position and the off position thousands of times every second. By varying the on and off time of each mirror, different shades of light intensity may be created in an image. More time in the on position during a time period results in more light reflected from an area of the screen corresponding to a pixel, while more time in the off position during a time period results in less light reflected from an area of the screen corresponding to a pixel. Color is included in the gray scale image by placing a color wheel (204) between the light source 202 and the mirror panel (208). As the color wheel (204) spins, it causes red, green, and blue (and sometimes white, depending upon the color wheel) light to fall on the DMD mirrors (208). The on positions and the off positions of each mirror are coordinated with these flashes of colored light and a projected image is produced on a projection screen (104).

In one embodiment, the DMD mirror 208 is capable of switching many times within the time increment corresponding to the transversal of visible light through each color segment of the rotating color wheel 204. Lens 210 is the main projection lens of projector 102 through which modulated projected colored light is directed to the screen 104.

As discussed with reference to FIG. 1, the screen 104 of FIG. 2 may be an active screen. Hence, the screen 104 may be a front projection screen characterized by one or more regions that are optically addressable to effect a change in reflectivity (or absorbance) characteristic. In one embodiment, the reflectivity of screen 104 is controllable in portions small enough to be of the size of areas on the screen corresponding to pixels projected onto screen 104. Additionally, the screen 104 may include an active layer (such as the active layer 116 of FIG. 1) and may be embodied in light sensitive material, photo-chromic material, or electro-chromic material. In some embodiments, the electrode layers 114 and 118 of FIG. 1 may be optional, e.g., to enhance or assist in the function or conditioning the active layer 116.

The change in reflectivity (or absorbance) response of the screen 104 may be caused by UV light, IR light, or other tuned wavelength light illuminating screen 104 such that the reflectivity response of multiple sections may be optically controlled by the projector 102. Accordingly, the system 200 may further include a light source 214 to emit non-visible light for illuminating screen 104, one or more optical elements 216, and a pixel 218.

The light source 214 may be any suitable electromagnetic radiation source that emits non-visible light (i.e. light not readily visible to the unaided human eye) such as UV and IR lamps. In an embodiment, the light source 214 is disposed within projector 102 opposite to light source 202 and about 12° with respect to the axis of lens 210, such that light emitted from the light source 214 may be reflected out of projector 102 through lens 210 when DMD mirror 208 is in its off position. In one embodiment, the light source 214 may be modulated in intensity, e.g., by optical elements 216 to cause a range of reflectivity (or absorbance) responses in the pixel 218. Also, the optical elements 216 may be utilized to sufficiently focus the light (from the light source 214) to enable modification of the optical characteristic of an area on screen 104 corresponding to a single pixel. This may allow the optical elements 216 to be designed for the non-visible wavelengths and not affect the design or cost of the optical elements 206 for the visible spectrum.

Optical elements 216 may include several elements that focus, collimate, direct, modulate, and/or filter UV or IR light (e.g., originating from the light source 214) before impinging on DMD mirror 208. Optical elements 216 may also shutter or selectively modulate the intensity of IR/UV light, e.g., allowing the ability to have an OFF state where one or more pixels (218) are not illuminated by the light source (202) but also not have the non-visible light source (214) affect the screen (104). This may also be done by shuttering or turning the non-visible light source (214) off to limit the non-visible source (214) from impinging on the DMD mirror 208. Optical elements 216 may include UV and/or IR filters, a channeling array such as a gooseneck set of mirrors, and one or more focusing elements and/or smoothing elements, such as an integrating rod, such that the UV or IR light that is directed to DMD mirror 208 is of an appropriate size, shape, area, uniformity, and within an appropriate IR, UV, or selected wavelength range.

Pixel 218 is an area on the surface or within the screen 104 whose area corresponds to a cross sectional area of a beam of visible light reflected from DMD mirror 208 in its on position or the UV or IR signal that may be reflected by DMD mirror 208 in its off position. Hence, the pixel 218 is optically addressable by the UV or IR signal (e.g., originating from the light source 214) to change its reflectivity (or absorbance) state in coordination with projected image (e.g., originating from the light source 202). In an embodiment, the pixel 218 may have a relatively quick response and operate while the non-visible light is active, in which case a temporal effect may be present to give the same or similar appearance as if the light source 214 was directed at the pixel 218 all the time. The pixel 218 may also have a relatively slow decay response, in which case it is relatively quickly activated and when the non-visible signal (105) is removed, the 218 pixel will start to change its absorbance, but is on long enough to work through the color phases of the color wheel 204. This may be done where the non-visible light is projected during the time DMD mirror 208 is in the off position during the white phase of the color wheel 204. Alternatively, signals may be relatively quick to establish the proper reflectivity and slow to decay. A reset signal may be provided (e.g., by the system controller 106 of FIG. 1) to clear the screen (104) to the greatest achievable reflectance state or greatest achievable absorbance state after each rotation of the color wheel 204, for example. As discussed with reference to FIG. 1, the reset may be controlled by the system controller 106 with the use of conductive layers (114, 118) on the screen (104) where the whole screen is reset and ready for the next application of non-visible light.

In operation, and in reference to FIGS. 1 and 2, light from the light source 202 passes through the rotating color segments of color wheel 204 and is focused, collimated, and/or filtered with optical elements 206 to direct red, green, or blue beams of light appropriately to DMD mirror 208. An electrode (not shown) underneath DMD mirror 208 is driven such that DMD mirror 208 switches between about +/−12° with respect to an axis (shown as a dotted vertical line 220).

When DMD mirror 208 is in its ON position (dotted 208 box), visible light from light source 202 is reflected through lens 210 and impinges upon active pixel 206, illuminating its area. During the time in which DMD mirror 208 is in its off position (solid 208 box), visible light from light source 202 is reflected by DMD mirror 208 into dump zone 212. The dump zone 212 may be a black cavity or other suitable zone capable of absorbing (i.e., not significantly reflecting) visible light rays directed to it, in various embodiments.

Furthermore, during the time when the DMD mirror 208 is in its ON position (dotted 208 box), non-visible light from the light source 214 is reflected by the DMD mirror 208 into an optional dump zone 222. The dump zone 222 may be a black cavity or other suitable zone capable of absorbing (i.e., not significantly reflecting) non-visible light rays directed to it, in various embodiments. Hence, unutilized (or unprojected) non-visible light rays (e.g., UV or IR) may be discarded in the dump zone 222. It is envisioned that suitable light dump zones (e.g., dump zones 212 or 222) may reduce heat removal issues resulting, for example, from the absorption of intermittent or continuous light rays by reducing internal reflections of light rays.

Additionally, when the DMD mirror 208 is in its OFF position, the light source 214 may have its light output controlled (through, for example, being programmed or shuttered) to transmit an IR or UV signal through (or off of in the case of reflective optics) optical elements 216 to reflect off of DMD mirror 208 in its OFF position and out of projector 102 through lens 210 to impinge upon pixel 218. The impingement of the IR or UV signal from the light source 214 upon pixel 218 triggers the pixel (218) to assume a specific optical characteristic (e.g., reflectivity or absorbance characteristic). The reflectivity (or absorbance) of screen 104 may thus be controlled in segments small enough to match the pixel resolution of projector 102. Alternatively, the reflectivity (or absorbance) of screen 104 may be controlled as a whole, as is the case with a single pixel active screen. Also, the reflectivity (or absorbance) of screen 104 may be controlled in select macro areas that are lesser in size than the area of screen 104 but larger in size than areas of size corresponding to a pixel.

In one embodiment, the non-visible light (from the light source 214) may be modulated by a plurality of data types and during the projection off state or to a portion of the projected surface, such as for sending audio information or other control data to the screen 104. For example, when the color wheel 204 is passing between colors (spoke time), the DMD modulator (208) may be in an off position since the transmitted light is not pure but a mix of the two adjacent color segments. If screen 104 has a relatively slow response, the DMD switching may be done fast enough and yet retain a dark portion on screen 104. During this time, relevant data may be transmitted to the screen 104 (or sensors embedded therein) with a relatively small effect on the image quality. Or, when the color wheel 204 is passing between color segments (spoke time) and the DMD mirror 208 is in the off position the light output of light source 214 may be interrupted (through being programmed to turn off or shuttered, for example) so that non-visible light does not reach screen 104 and cause pixel 218 to change to a relatively low reflectivity (or relatively high absorbance) state. This would be desired because during the time interval corresponding to the segment of the color wheel following the spoke time it may be appropriate for the image to be displayed to have the pixel 218 of screen 104 in a relatively high reflectivity (or relatively low absorbance) state.

For example, the light source 214 may have its light output controlled (through, for example, being programmed or shuttered) to periodically provide a UV or IR light to DMD mirror 208 during times in which DMD mirror 208 is in an OFF position to thereby reflect the UV or IR signal to pixel 218 and optically cause a desired reflectivity (or absorbance) response (caused by a chemical response to the light or an electrical signal provided in response to the light or temperature change). A UV or IR (non-visible) light may be delivered to pixel 218 any time DMD mirror 208 is in its OFF position or may occur less frequently. A reflectivity (or absorbance) response may be caused to occur in coordination with projected image data. For example, for dark scenes or dark portions of scenes, the pixel 218 may assume a lesser reflectivity state because its reduced reflectivity allows finer intensity impacts for switches of DMD mirror 208 to its on position. In an embodiment, this may provide the desired results when the affected regions (by the UV or IR information) are larger than the individual visible pixels. In this case, the visible parts of the image overlaid on the darker segment of the screen may compensate for the different reflectance levels to maintain a given overall intensity for the portion of the image within the dark zone. Since the reflectivity factor of that portion of the screen may be lower than a gain of 1.0, then each bit change of the visible pixel may represent smaller steps than 1.0 for each intensity change. Hence, each step may be finer than if the visible pixels were projected onto a highly reflective screen.

In a further embodiment, the light source 214 may have its light output controlled (through, for example, being programmed or shuttered) to provide a UV or IR signal to DMD mirror 208 during the time or a portion of time in which white light is presented to DMD mirror 208 from the transmission of visible light from light source 202 through the white segment of color wheel 204. As the white light is, in some embodiments, mostly discarded to dump zone 212 during dark scenes, an UV or IR signal may be transmitted during this time, as the DMD mirror 208 is in its off position thus appropriately disposed to reflect UV or IR light to cause pixel 218 to change reflectivity (or absorbance). The shuttering of the light source 214 may effectively provide light during the white segment timing of the color wheel 204, but may also be provided over the rest of the color wheel times as well. During some relatively light scenes, visible light from light source 202 may be passed through the white segment of color wheel 204 and directed by DMD mirror 208, disposed in the on position, to screen 104. For these types of scenes when DMD mirror 20 is disposed in the off position the light output of light source 214 may be interrupted (through being programmed to turn off or shuttered, for example) so that non-visible light does not reach screen 104 and cause pixel 218 to change to a relatively low reflectivity (or relatively high absorbance) state. In other embodiments, the light output of light source 214 may be similarly interrupted in relation to one or more other segments of color wheel 204.

For implementing this, in one embodiment, a light source (similar to light source 214) to provide non-visible light is included in a projector (102) and is positioned adjacent a light dump zone (212) such that the DMD mirrors (208) in their OFF positions permit non-visible light from this light source to be directed to a screen (104) and, upon their impingement, provide control information at the screen for modifying an optical characteristic of a portion of the screen.

Figure 3:
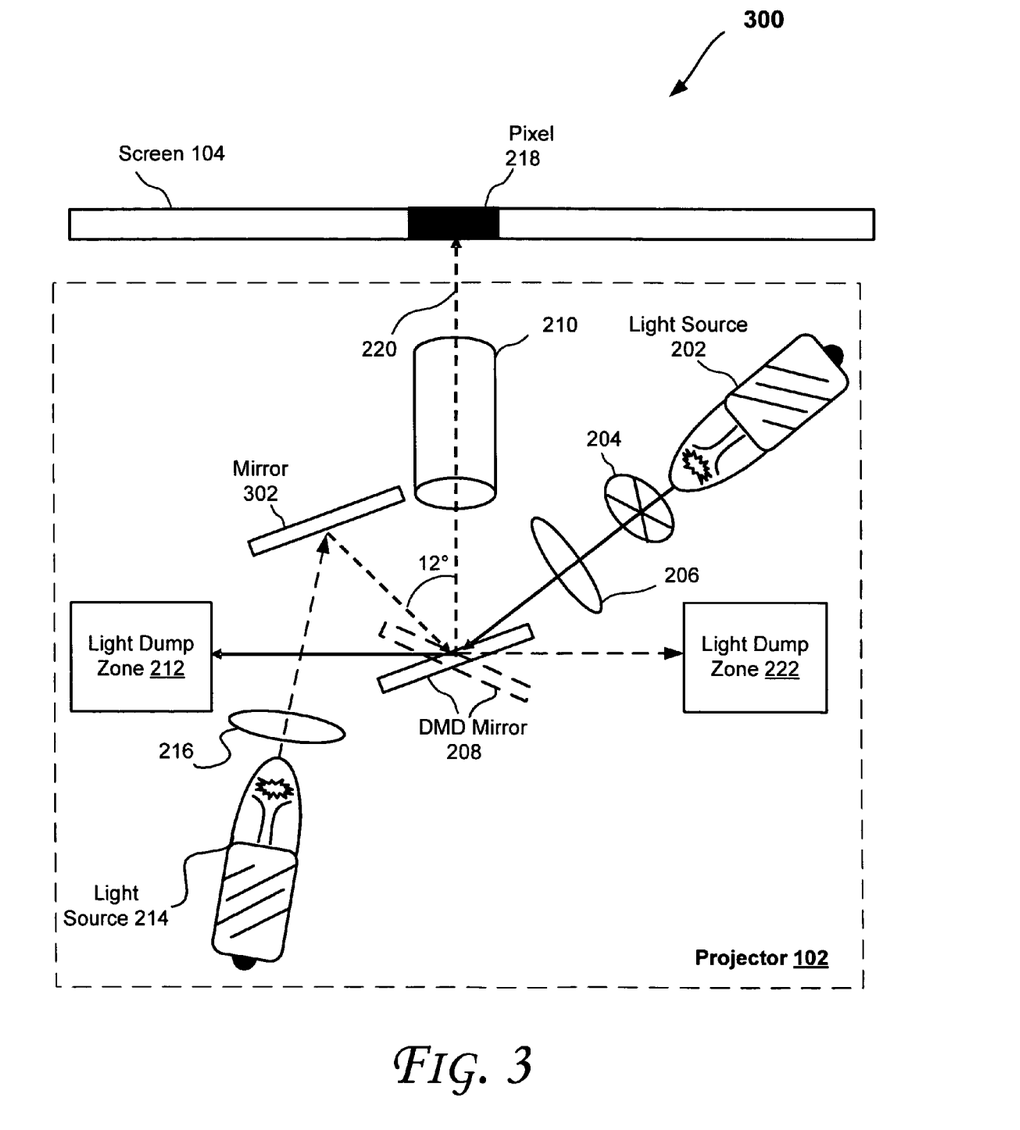

FIG. 3 illustrates sample components of an embodiment of a projection system 300, according to an embodiment. The projection system 300 includes the projector 102 and screen 104. The projector 102 includes the light source 202 to provide visible light, color wheel 204, optical elements 206, one or more digital micromirror device (DMD) mirrors 208, lens 210, light dump zone 212, light source 214 to provide non-visible light, optical elements 216, pixel 218, axis 220, and light dump zone 222 such as discussed with reference to FIG. 2.

The projection system 300 also includes a mirror 302 to reflect the non-visible light from the light source 214 towards the DMD mirror 208. Also, as illustrated in FIG. 3, the location of the light source 214 is changed in the system 300 compared with the system 200. The mirror 302 may enable locating the light source 214 in a range of locations within the projector 102. The placement of the light source 214 adjacent to light dump zone 212, as is the case with projection system 200, may cause visible light not absorbed within the dump zone 212 to reflect back onto the light source 214. In some embodiments, mirror 302 may also be configured to filter out visible wavelengths impinging upon it. Alternatively, the light source 202 may be configured to emit light in the non-visible spectrum during selected times. This light may be routed so that the light, for part of its path, follows the path of light emitted from the light source 214 as shown in FIG. 3. This may be done to augment the light source 214 or may provide an embodiment without a separate light source.

Figure 4:
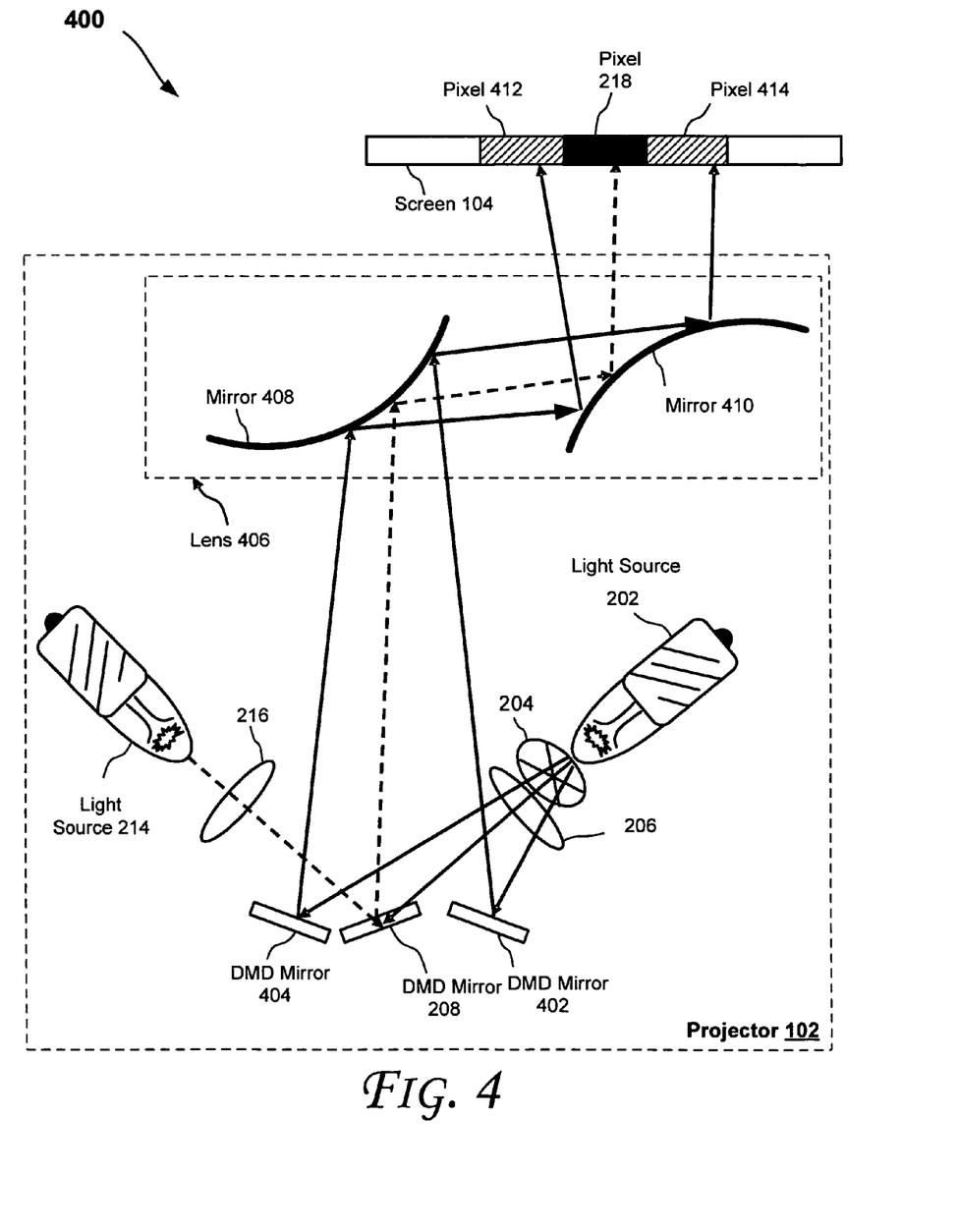

FIG. 4 illustrates sample components of an embodiment of a projection system 400, according to an embodiment. The projection system 400 includes the projector 102 and screen 104. The projector 102 includes the light source 202, color wheel 204, optical elements 206, one or more digital micromirror device (DMD) mirrors (208, 402, and 404), lens 406, optical elements 216, and one or more pixels (218, 412, and 414), some of which were discussed with reference to FIGS. 2 and 3.

In an embodiment, the lens 210 of FIGS. 2 and 3 is replaced with the lens 406. The lens 406 may allow transmission of visible light as well as non-visible light (e.g., UV or IR light) with relatively low attenuation. The lens 406 may be provided with an appropriate arrangement of mirrors, such as mirror 408 and mirror 410. Mirrors 408 and 410 may be surface reflective optical elements that are efficient in reflecting UV or IR light.

Figure 5:
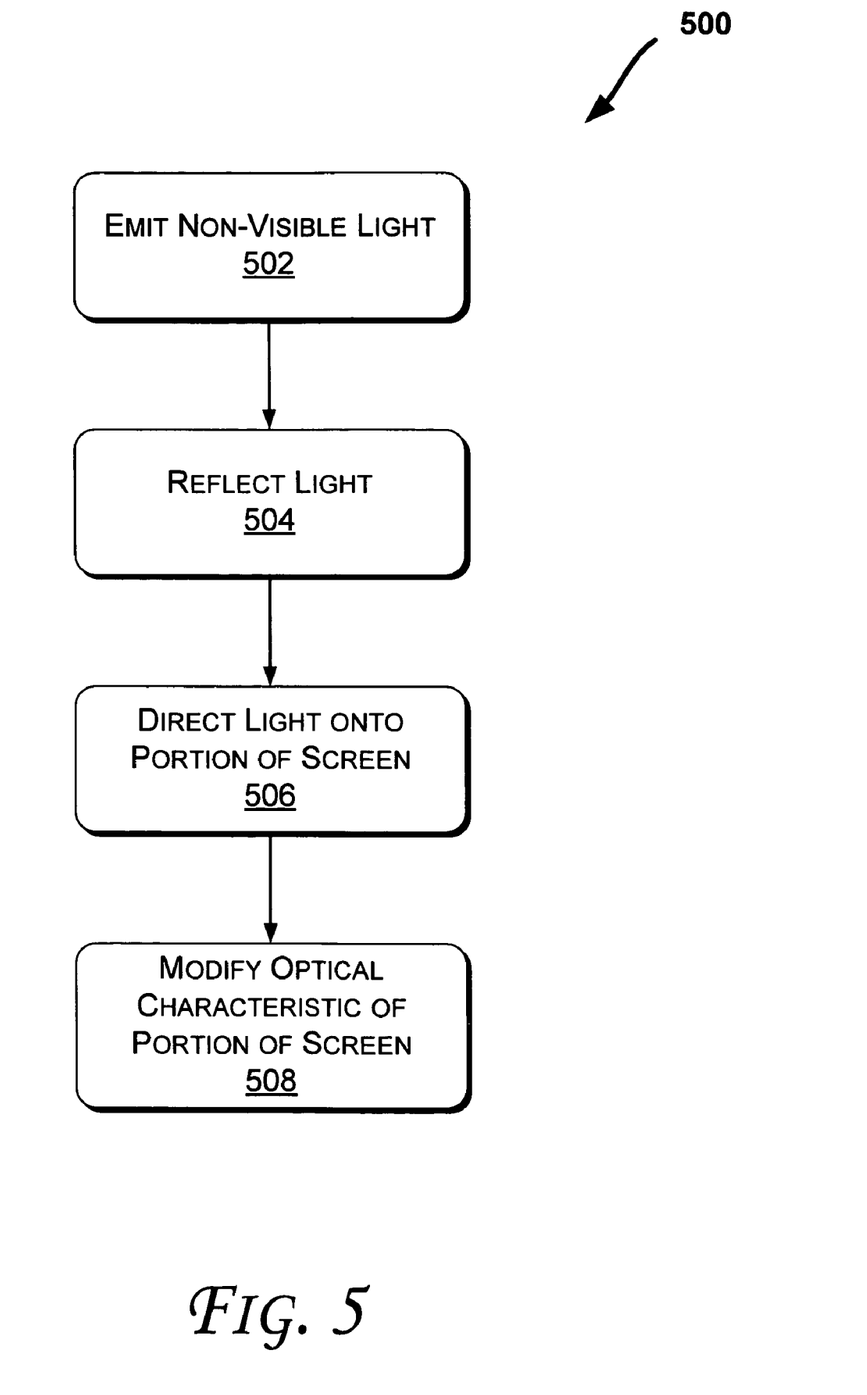
FIG. 5 illustrates an embodiment of a method for modifying an optical characteristic of a screen, according to an embodiment.

FIG. 5 illustrates an embodiment of a method 500 for modifying an optical characteristic of a screen, according to an embodiment. For example, the method 500 may be utilized to modify an optical characteristic (e.g., reflectivity and/or absorbance) of a portion of the screen 104 of FIG. 1 by utilizing non-visible light to be projected onto a portion of the screen, such as discussed with reference to FIGS. 2-4.

As discussed with reference to FIGS. 2-4, non-visible light may be emitted (502) by an electromagnetic radiation source (e.g., the light source 214 of FIGS. 2-4). The light may be reflected (504) off of one or more mirrors (e.g., the mirrors 208 of FIG. 2, 302 of FIG. 3, and/or 408-410 of FIG. 4) prior to providing the light to the screen (e.g., the screen 104 of FIGS. 1-4). The light is then directed onto a portion of the screen (506). The portion of the screen may be one or more pixels of the screen. Furthermore, the light may be emitted when no visible light (e.g., from the light source 202 of FIGS. 2-4) is projected on the portion of the screen. As discussed with reference to FIG. 2, the non-visible light may be modulated by a plurality of data types (such as audio and control data). Also, during an off state of an electromagnetic radiation source (such as the light source 202 of FIGS. 2-4) configured to emit visible light, the non-visible light may be modulated by one or more data types (such as audio and control data). The light modifies an optical characteristic of the portion of the screen (508) such as discussed with reference to FIGS. 1-4.

In one embodiment, the systems 100-400 of FIGS. 1-4, respectively, may include one or more processor(s) (e.g., microprocessors, controllers, etc.) to process various instructions to control the operation of the screen (104), the projector (102), the DMD mirrors (208 of FIGS. 2-4 and 402-404 of FIG. 4), and/or the projection system controller (106). The systems 100-400 may also include a memory (such as read-only memory (ROM) and/or random-access memory (RAM)), a disk drive, a floppy disk drive, and a compact disk read-only memory (CD-ROM) and/or digital video disk (DVD) drive, which may provide data storage mechanisms the processors.

One or more application program(s) and an operating system may also be utilized which may be stored in non-volatile memory and executed on the processor(s) discussed above to provide a runtime environment in which the application program(s) may run or execute.

Some embodiments discussed herein (such as those discussed with reference to FIG. 5) may include various operations. These operations may be performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or machine-readable media suitable for storing electronic instructions and/or data. Moreover, data discussed herein may be stored in a single database, multiple databases, or otherwise in select forms (such as in a table). For example, various computer-readable media may be utilized to activate the light (generated by the light source 214 of FIGS. 1-4) or control the DMD mirrors (208 of FIGS. 2-4 and 402-404 of FIG. 4).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method, comprising:
reflecting non-visible light off one or more mirrors in an off position; and
illuminating a portion of a screen with the non-visible light, wherein the one or more mirrors are to reflect light from at least part of a segment of a color wheel.

2. The method of claim 1, wherein the portion of the screen is one or more pixels of the screen.

3. The method of claim 1, further comprising providing the non-visible light selected from a group comprising ultraviolet light and infrared light.

4. The method of claim 1, further comprising transmitting the non-visible light when no visible light is projected on the portion of the screen.

5. The method of claim 1, further comprising modulating the non-visible light with a plurality of data types.

6. The method of claim 1, further comprising modulating the non-visible light with one or more data types during an off state of an electromagnetic radiation source configured to emit visible light.

7. The method of claim 1, further comprising focusing the non-visible light to modify the optical characteristic of a single pixel projected on the screen.

8. The method of claim 1, further comprising:
modifying an optical characteristic of the screen using the non-visible light.

9. The method of claim 8, wherein the characteristic is selected from a group comprising a screen reflectivity and a screen absorbance.

10. The method of claim 1, further comprising:
interrupting output of the non-visible light from a light source configured to emit non-visible light when the one or more mirrors are in the off position after being in an on position during at least part of a segment of the color wheel.

11. The method of claim 1, further comprising:
interrupting output of the non-visible light from a light source configured to emit non-visible light when the one or more mirrors are in the off position during a time interval corresponding to a time between successive segments of the color wheel.

12. An apparatus comprising:
a electromagnetic radiation source capable of providing non-visible light; and
one or more mirrors to reflect the non-visible light, with the one or more mirrors in an off position, to illuminate a portion of a screen,
wherein the one or more mirrors are to reflect light from at least part of a segment of a color wheel.

13. The apparatus of claim 12, wherein the screen is a projection screen selected from a group comprising a rear projection screen and a front projection screen.

14. The apparatus of claim 12, wherein the one or more mirrors are surface reflective optical elements.

15. The apparatus of claim 12, further comprising a visible electromagnetic radiation source to project an image on the screen.

16. The apparatus of claim 12, wherein the one or more mirrors are one or more digital micromirror devices.

17. The apparatus of claim 12, further comprising one or more light dump zones to absorb light rays.

18. The apparatus of claim 12, further comprising:
optics configured to direct the non-visible light to the one or more mirrors in the off position, with the electromagnetic radiation source further capable of providing visible light.

19. The apparatus of claim 12, further comprising a projection system controller coupled to the screen to coordinate one or more operations of the screen.

20. The apparatus of claim 12, wherein the screen is configured to modify a reflectance or absorbance of the screen using the non-visible light.

21. A computer-readable medium comprising:
stored instructions to reflect non-visible light off one or more mirrors in an off position; and
stored instructions to illuminate a portion of a screen with the non-visible light,
wherein the one or more mirrors are to reflect light from at least part of a segment of a color wheel.

22. The computer-readable medium of claim 21, further comprising stored instructions to transmit the non-visible light when no visible light is projected on the portion of the screen.

23. A method comprising:
step for providing non-visible light; and
step for causing the non-visible light to impinge on a portion of a screen when one or more mirrors are in an off position,
wherein the one or more mirrors are to reflect light from at least part of a segment of a color wheel.

24. The method of claim 23, further comprising step for causing transmission of the non-visible light when no visible light is projected on the portion of the screen.

25. An apparatus comprising:
means for emitting non-visible light; and
means for reflecting the non-visible light to illuminate a portion of a screen,
wherein the one or more mirrors are to reflect light from at least part of a segment of a color wheel.

26. The apparatus of claim 25, further comprising means for transmitting the non-visible light when no visible light is projected on the portion of the screen.

27. The apparatus of claim 25, further comprising means for modulating non-visible light with a plurality of data types.

* * * * *